United States Patent [19]

Capelli

[11] 4,056,478
[45] Nov. 1, 1977

[54] BEARING MATERIAL EMPLOYING FRANGIBLE MICROCAPSULES CONTAINING LUBRICANT

[75] Inventor: Alfred J. Capelli, Palos Verdes Peninsula, Calif.

[73] Assignee: Sargent Industries, Inc., Los Angeles, Calif.

[21] Appl. No.: 649,528

[22] Filed: Jan. 15, 1976

Related U.S. Application Data

[62] Division of Ser. No. 403,453, Oct. 4, 1973, Pat. No. 3,950,047.

[51] Int. Cl.² ............... C10M 5/00; C10M 7/00; F16C 27/00
[52] U.S. Cl. ............... 252/12.4; 252/12; 252/12.2; 252/12.6; 308/72; 308/76; 308/78; 308/238; 308/240; 308/116
[58] Field of Search ............... 252/12.4, 12.6, 10, 252/11, 12, 12.2; 308/72, 76, 78, 116 B, 35, 238, 342, 240; 161/58, 59, 60, 92, 151, 167, 189, 152, 158, 260, 275

[56] References Cited

U.S. PATENT DOCUMENTS

| | | | |
|---|---|---|---|
| 3,269,943 | 8/1966 | Armstrong | 252/12 |
| 3,431,203 | 3/1969 | Hartmann et al. | 252/12.2 |
| 3,455,864 | 7/1969 | Dodson et al. | 260/33.6 |
| 3,480,547 | 11/1969 | Van Dyk | 252/12.6 |
| 3,549,531 | 12/1970 | Santt | 252/26 |
| 3,594,049 | 7/1971 | Turner | 308/72 |
| 3,674,689 | 7/1972 | Giltrow et al. | 252/12.4 |
| 3,779,918 | 12/1973 | Ikeda et al. | 252/12.6 |
| 3,781,205 | 12/1973 | Cairns et al. | 252/12.6 |
| 3,900,408 | 8/1975 | Turner | 252/12.6 |

FOREIGN PATENT DOCUMENTS

| | | | |
|---|---|---|---|
| 791,665 | 8/1968 | Canada | 252/12.2 |

*Primary Examiner*—Floyd D. Higel
*Attorney, Agent, or Firm*—Ellsworth R. Roston

[57] ABSTRACT

A bearing material is formed from a body, a binder and a plurality of microcapsules uniformly dispersed in the binder and containing a lubricant. The microcapsules are adapted to be broken upon the exertion of a force and to release the lubricant. The lubricant may be a solid or a fluid. Lubricants having individual properties may be disposed in different microcapsules. For example, a lubricant operative to provide a lubrication at high temperatures may be disposed in some of the microcapsules and a lubricant operative to provide a lubrication at low temperatures may be disposed in other microcapsules. The body may be a fabric or may be formed from randomly oriented fibers defining a fibrous mat having a porous relationship.

13 Claims, 6 Drawing Figures

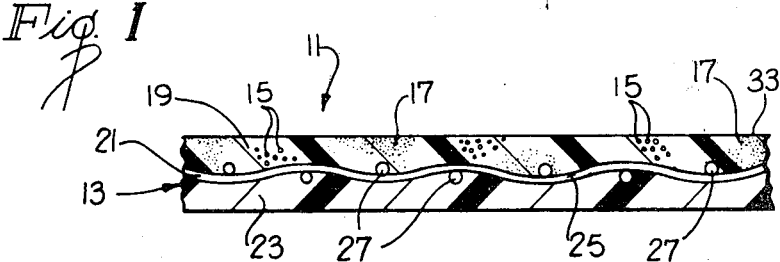
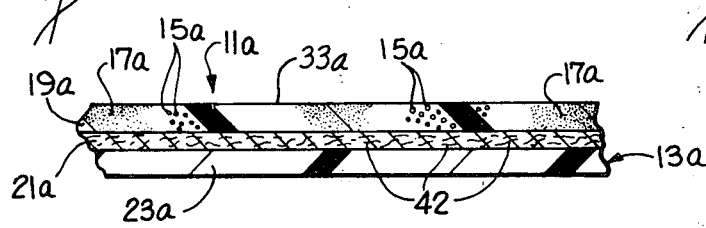
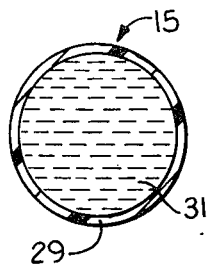
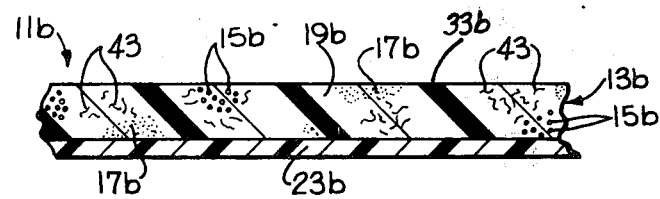
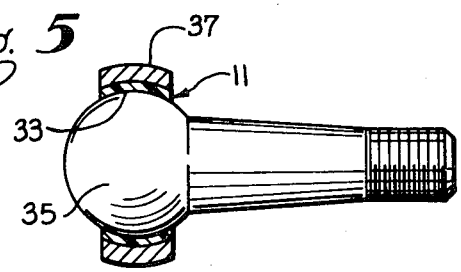
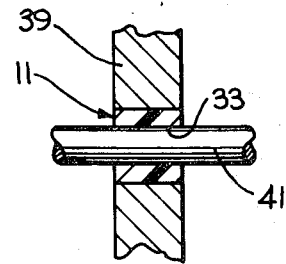

BEARING MATERIAL EMPLOYING FRANGIBLE MICROCAPSULES CONTAINING LUBRICANT

This is a division of application Ser. No. 403,453 (now U.S. Pat. No. 3,950,047) filed Oct. 4, 1973.

BACKGROUND OF THE INVENTION

U.S. Pat. No. 3,594,049 describes a bearing liner which includes a fabric backing member and a low friction layer adhered to the backing member. The low friction layer includes a matrix formed of a suitable binder and dry lubricant particles, for example, Teflon particles dispersed in the matrix. The fabric backing member provides strength and the lubricant lubricates the wear surface of the bearing liner. The results obtainable with this bearing liner are excellent and the wear rate is low.

Several variations of this bearing liner have been proposed. However, each of these variations also employs dry lubricant particles in a matrix.

Dry lubricants are satisfactory for many applications, however, dry lubricants have certain environmental limitations which nonsolid lubricants, such as oils and greases, do not have. For example, nonsolid lubricants which are usable at high temperatures and low temperatures are available whereas dry lubricants do not have this capability.

In order to take advantage of certain properties of nonsolid lubricants, it would be desirable to employ them in bearing material of the type described above. Unfortunately, it has not been possible heretofore to disperse oil or grease in the binder or matrix. One specific problem is that the lubricant tends to react chemically with the binder prior to the time the binder is cured.

SUMMARY OF THE INVENTION

The present invention makes it possible to use nonsolid lubricants in bearing material. This is accomplished by microencapsulation of the nonsolid lubricant in the body of the bearing material. As used herein "nonsolid lubricant" includes liquid lubricants such as oil and readily extrudable paste-like lubricants such as grease and excludes solid and powdered lubricants such as polytetrafluoroethylene (commercially available under the trademark Teflon) powder. An important advantage of using nonsolid lubricants is that the number of applications for bearing materials is substantially increased. The bearing material of this invention can be used as a bearing liner, a bearing, or a portion of a bearing such as a race for a spherical bearing.

As is well known, microencapsulation involves forming a very tiny, frangible capsule around a small quantity of a substance. One prior art use of microencapsulation is in carbonless carbon paper. It is also known to microencapsulate corrosives to facilitate handling and transport.

With the present invention, a nonsolid lubricant such as oil or grease is encapsulated in numerous tiny, frangible capsules or shells. For example, the capsules may be 50 microns in diameter.

The bearing material of this invention includes a body and the capsules are dispersed in the body. The body of the bearing material at least partially defines a wear surface which is adapted to slidably cooperate with, and/or support, an external member such as a rod. The engagement between the wear surface and the member breaks the capsules which are closely adjacent the wear surface. This frees the nonsolid lubricant in the broken capsules and such freed lubricant lubricates the wear surface. The capsules remote from the wear surface are not broken initially. However, the capsules within the body are progressively broken as the body wears away along the wear surface. Accordingly, the lubricant is freed from the capsules in a progressive manner and as the lubricant is needed. Moreover, there is no danger of the lubricant combining chemically with the binder because the binder has been cured before it is exposed to the liquid lubricant. Although microencapsulation is particularly adapted for nonsolid lubricants, it can be used for any lubricant, the release or exposure of which should be delayed.

As this invention makes it possible to employ nonsolid lubricants in bearing materials of this type, the environmental shortcomings of dry lubricants are no longer a limiting factor to the extent that nonsolid lubricants, which overcome these shortcomings, are available. To illustrate, a lubricant having desirable low temperature characteristics may be encapsulated and employed in a bearing material of this type thereby making the bearing material usable at very low temperatures. The same bearing material could be adapted for use in the low temperature and middle temperature ranges by dispersing a dry particulate lubricant such as powdered Teflon in the body. The dry lubricant would perform a lubricating function in the middle temperature range but would be substantially inoperative as a lubricant in the low temperature range. The dry lubricant need not be encapsulated and can be dispersed throughout the matrix. Another variation is to add microencapsulated high temperature lubricant. Such an addition would make this bearing material usable at high, low, and intermediate temperatures.

The body of the bearing member may be of different constructions. Generally the body should include a component for binding the capsules together and another component for providing strength. The binder forms a matrix in which the capsules can be dispersed. The component which provides strength may be, for example, a fabric as disclosed in the abovementioned U.S. Pat. No. 3,594,049, matted fibers, or chopped fibers.

DESCRIPTION OF THE DRAWINGS

The invention can best be understood by reference with the following description taken in connection with the accompanying illustrative drawing.

FIG. 1 is a fragmentary, sectional view of a bearing material constructed in accordance with the teachings of this invention.

FIG. 2 is a sectional view on a greatly enlarged scale of a tiny frangible lubricant capsule which is employed in the bearing material.

FIG. 3 is a sectional view of a second form of bearing material constructed in accordance with the teachings of this invention.

FIG. 4 is a fragmentary sectional view of a third form of bearing material constructed in accordance with the teachings of this invention.

FIG. 5 is an elevational view, partially in section, of a bearing employing the bearing material of this invention.

FIG. 6 is a fragmentary sectional view of a second form of bearing employing the material of this invention.

DESCRIPTION OF THE PREFERRED EMBODIMENTS

FIG. 1 shows a bearing material 11 which includes a body 13, lubricant capsules 15, and lubricant particles 17. Except for the presence of the lubricant capsules 15, the bearing material 11 may be identical to the bearing material disclosed in common assignee's U.S. Pat. No. 3,594,049.

The body 13 includes a matrix 19 constructed of a binder or adhesive, a fabric backing member 21, and an adhesive layer 23 for attaching the bearing material 11 to an external member. The matrix 19 must be constructed of a material which is capable of binding or holding the lubricant capsules 15 and the lubricant particles 17. For example, a phenolic base adhesive such as Rabond R-84015 produced by Raybestos-Manhattan of Bridgeport, Connecticut or Resiweld R-7119 produced by H. B. Fuller Corporation may be employed. Both of these adhesives are thermosetting two stage adhesives which give a strong chemical bond. Both of these adhesives can be hardened without curing by heating to a temperature under 212° F. and can be cured in two stages by heating to temperatures of 330° and 375° F. respectively. Of course, the material selected must cure at a low enough temperature to prevent destruction of the lubricant capsule 15. In addition, the binder must cure at less than 300 psi to avoid breaking of the capsules 15.

The matrix 19 and the adhesive layer 23 are bonded to the opposite faces of the backing member 21. The adhesive layer 23 may be constructed from the same material as the matrix 19. The backing member 21 can advantageously be in the form of a woven sheet and includes a plurality of warp strands 25 (only one being shown in FIG. 1) and a plurality of filler strands 27. The strands 25 and 27 can be woven together in any suitable manner to provide a strong backing member. Each of the strands 25 and 27 is made up of many small fibers (not shown). The backing member 21 is preferably constructed of a synthetic material such as Dacron, Nylon, or Rayon. In the embodiment illustrated, the backing member 21 is 6½ ounce plain weave, 100% Dacron fiber designated by Style No. 5133 and obtainable from the Texlon Corporation of Torrance, California. This fabric provides pores of a proper size for purposes which are described in said U.S. Pat. No. 3,594,049. The woven backing member 21 has tensile strength in substantially all directions lying in the plane of the backing member. The matrix 19 preferably has a thickness of 0.0024 inch to 0.0035 inch with 0.003 inch being considered optimum and with these dimensions being from the uppermost (as viewed in FIG. 1) part of the backing member 21 to a wear surface 33.

The lubricant capsules 15 and particles 17 are uniformly distributed throughout the matrix 19. Each of the lubricant capsules 15 includes a frangible shell or capsule 29 and a nonsolid lubricant 31. The shell 29 is generally spherical, very tiny, and frangible.

The shell 29 must be constructed of a material which is suitable for microencapsulation and which does not adversely effect the properties of the lubricant 31. For example, polyvinyl alcohol may be used as the encapsulating material. The lubricant 31 may be encapsulated in accordance with known microencapsulation processes such as the process developed by NCR of Dayton, Ohio, and described in an NCR technical publication entitled "Microencapsulation the Process and its Capabilities."

The characteristics of the lubricant 31 within the shell 29 will be selected in accordance with the contemplated use of the bearing material 11. The nonsolid lubricant 31 may have particular environmental capabilities such as desirable high and low temperature characteristics or it may be a general purpose lubricant. A liquid lubricant known as Dow-Corning 200 is a suitable general purpose lubricant. Examples of nonsolid, low temperature lubricants which can be encapsulated and used at temperatures down to about minus 60° F. are identified by the by the following military specifications MIL-L-7870A, MIL-L-10295B, MIL-L-10324A and MIL-L-14107B. Examples of nonsolid, high temperature lubricants which can be encapsulated and used at temperatures up to about 500° F. are identified by the following military specifications MIL-A907D, MIL-G-81322A, MIL-G-27617A, MIL-G-3545C (MR) and MIL-L-25681C.

The lubricant particles 17 are dry. Examples of suitable dry lubricant materials are polytetrafluoroethylene, fluoroethylene propylene, polyethylene, graphite, molybdenum, Nylon, and Dacron. Nylon and Dacron are generally considered to be abrasive when used with a steel bearing but they may be used, for example, with ceramic bearings which are quite abrasion resistant. For many applications, a fluorocarbon, such as polytetrafluoroethylene is preferred. The dry lubricant may also include minor proportions of a metal powder additive such as bronze, babbit or lead. In the embodiment illustrated, the dry lubricant is composed of five micron polytetrafluoroethylene pure powder.

The particles 17 may be omitted from the bearing material 11 depending upon the results desired. Stated differently, if the dry lubricant particles 17 provide a desired lubricating characteristic, they may be used; however, if they do not provide a characteristic which is necessary or desirable for a particular application, only the lubricant capsules 15 may be employed in the bearing material 11.

The bearing material 11 can be used as a bearing liner as shown in FIG. 5. In FIG. 5, the wear surface 33 slidably engages the surface of a spherical ball 35. The bearing material 11 is adhered by the adhesive layer 33 to a race 37. The bearing liner 11 allows low friction, sliding, universal movement between the ball 35 and the race 37.

Forcible contact between the wear surface 33 and the ball 35 causes the shells 29 closely adjacent the wear surface to break, thereby freeing the lubricant 31. The lubricant 31 so freed acts to lubricate the wear surface 33. The shells 29 which are more remote from the wear surface 33 are not broken by the contact between the wear surface and the ball 35. However, as the bearing material 11 wears, its thickness is reduced. This brings unbroken shells 29 closer to the wear surface 33 with the result that these additional shells are broken thereby freeing additional lubricant 31. Thus, the capsules 15 are progressively broken as the bearing liner 11 wears to assure that the surface 33 will remain lubricated.

The lubricant 31 and the lubricant particles 17 can cooperate to provide a wide range of environmental conditions under which the bearing material 11 can be used. For example, a first group of the shells 29 may have a low temperature nonsolid lubricant and a second group of the shells may have a high temperature nonsolid lubricant. The dry lubricant particles may be suitable for a middle temperature range such as about −20° to about 350° F. This means that all three kinds of lubricant will be present at any one time at the wear surface 33. However, at very low temperatures the dry particles 17 become very rigid and are themselves lubricated by the low temperature lubricant. Similarly, the high temperature liquid lubricant freezes at low temperatures and is also lubricated by the low temperature lubricant.

At high temperatures, the low temperature lubricant boils off at the wear surface 33 and the lubricant particles 17 deteriorate. Accordingly, only the high temperature lubricant is effective to lubricate the wear surface 33 under these conditions.

Similarly, in the middle temperature range, the low temperature lubricant boils off and the high temperature lubricant is frozen or too viscous to be effective. Accordingly, the lubricant particles 17 lubricate the wear surface 33 under these conditions. Other combinations of lubricants can be employed to further expand the range of environmental applications for the bearing material 11.

FIG. 6 shows another illustrative manner in which the bearing material 11 can be used. In FIG. 6, the bearing material 11 is formed into a sleeve bearing and bonded by the adhesive layer 23 to a bearing block 39. A rod 41 is slidably supported by the wear surface 33 for reciprocating movement relative to the bearing block 39.

FIG. 3 shows a bearing material 11a. Portions of the bearing material 11a corresponding to portions of the bearing material 11 are designated by corresponding reference numerals followed by the letter "a". One advantage of the embodiment of FIG. 3 is that the stress-strain characteristics are more nearly linear than with the embodiment of FIG. 1.

The bearing material 11a is identical to the bearing material 11 except that the backing member 21a is composed of randomly oriented fibers 42 matted together to form a fibrous mat such as paper. The backing member 21a is preferably compressed to reduce its porosity. The fibers 42 can take different forms although compressed vegetable fibers commonly available in the form of paper are particularly advantageous and economical. Calendered paper and rice paper contain highly compressed fibers and are highly desirable. The backing member 21a can comprise one or more layers of paper. Except for the presence of the lubricant capsules 15a, which are evenly distributed throughout the matrix 19, the bearing material 11a can be identical to the bearing material described in common assignee's application Ser. No. 274,606, filed July 24, 1972, entitled "Bearing Liner," and naming Peter H. Turner as the inventor. This application is incorporated by reference herein.

The lubricant capsules 15a and the lubricant particles 17a function in the same manner in the bearing material 11a as in the bearing material 11. Thus, the embodiment of FIG. 3 provides a different form of body 13a in which the lubricant capsules 15a can be utilized. The bearing material 11a may be used, for example, as shown in FIGS. 5 and 6.

FIG. 4 shows a bearing material 11b which is identical to the bearing material 11 in all respects not shown or described herein. Except for the presence of the lubricant capsules 15b, the bearing material 11b is identical to the bearing material disclosed in common assignee's application Ser. No. 368,695 filed on June 11, 1973 naming Peter H. Turner and Alfred J. Capelli as the inventors and entitled "Bearing Material Employing Chopped Fibers." This application is incorporated by reference herein.

The bearing material 11b has no backing member, but only a matrix 19b and an adhesive layer 23b. The lubricant capsules 15b and the dry lubricant particles 17b are uniformly distributed throughout the matrix 19b from one face to the other.

Although the bearing material 11b has no backing member, it does have numerous, small, short, randomly oriented, chopped fibers 43 uniformly distributed throughout the matrix 19b. Each of the fibers should have as small a diameter as possible; however, if the diameter is less than 0.001 inch, the total strength of the fiber is reduced to such an extent that the bearing material 11b may not be suitable for certain purposes. The larger the diameter of the fibers 39, the greater the area of the wear surface 33b which is made up of these fibers. This in turn reduces the amount of such area that is defined by the lubricant. Accordingly, to allow proper lubrication of the wear surface 33, the diameter of the fibers is preferably restricted. Although the maximum diameter of the fibers 39 will vary depending upon the particular application involved, an upper limit of .003 inch is desirable for many applications.

The fibers 39 should be short because long fibers make molding of the bearing more difficult. On the other hand, the fibers must be of sufficient length to impart adequate strength to the bearing material 11b. Preferably the fibers 43 are between 0.062 inch and 0.125 inch in length.

Each of the fibers 43 is a monofilament fiber. Although each of the fibers 43 could be composed of a plurality of separate strands, it would be difficult to maintain the diameter limitation on a fiber that was not a monofilament fiber. The fibers 39 may be constructed of the same materials as the backing member 21 (FIG. 1). The fibers are randomly oriented. The ratio of the matrix 19b to the fibers 43 may be, for example, 3:1.

The matrix 19b may be of virtually any thickness. One advantage of the bearing material 11b is that the matrix 19b can be used in greater thicknesses than the matrix 19 (FIG. 1). In addition the bearing material 11b, without the adhesive layer 23b, can be molded to form, for example, the entire race for a bearing of the type shown in FIG. 5. Of course the bearing material 11b can also be used as shown in FIGS. 5 and 6.

In making the bearing material 11 and 11a, the binder is mixed with the lubricant capsules 15 and with the lubricant particles 17 if the latter is used. The mixture can then be applied to the backing members 21 and 21a as taught, for example, in U.S. Pat. No. 3,594,049 referred to above. In the case of the bearing material 11b, the fibers 43 are also mixed with the binder and with the lubricant capsules 15 and the dry lubricant particles 17b and the resultant mixture can be molded or otherwise utilized in accordance with the application referred to above relating to the bearing material of FIG. 4.

Although exemplary embodiments of the invention have been shown and described, many changes, modifications and substitutions may be made by one having ordinary skill in the art without necessarily departing from the spirit and scope of this invention.

I claim

1. A bearing material engagable with a member comprising:
   a plurality of frangible microcapsules;

a lubricant in said microcapsules and having properties of being released from the microcapsules upon the breaking of the capsules;

a porous body;

said microcapsules being substantially uniformly distributed through at least a portion of said body and being mechanically bonded in the pores of the porous body;

at least said portion of said body at least partially defining a wear surface engagable with the member;

the frangible capsules adjacent said wear surface being breakable upon forcible engagement of the wear surface and the member whereby the lubricant in such broken capsules is released to lubricate said wear surface;

said body including a binder forming a matrix, said matrix defining at least a portion of said wear surface, said capsules being substantially uniformly distributed throughout said matrix; and said body including a fabric backing member defining the pores for mechanically bonding the microcapsules relative to the body.

2. A bearing material engaging with a member comprising:

a plurality of frangible microcapsules;

a lubricant disposed in said microcapsules and provided with properties of being released from the microcapsules upon the breaking of the microcapsules;

a body having a plurality of pores for mechanically bonding the microcapsules;

said capsules being substantially uniformly distributed throughout at least a portion of said body;

at least said portion of said body defining a wear surface engagable with the member;

the frangible capsules adjacent said wear surface being breakable upon forcible engagement of the wear surface and the member whereby the lubricant in such broken capsules is released to lubricate said wear surface;

said body including a binder forming a matrix, said matrix defining at least a portion of said wear surface, said capsules being substantially uniformly distributed throughout said matrix; and said body including randomly oriented fibers defining a fibrous mat having a porous relationship for receiving the microcapsules in the mechanically bonded relationship.

3. A bearing material as defined in claim 2 wherein the fibrous mat is compressed to reduce its porosity.

4. A bearing material as defined in claim 1 wherein the lubricant is nonsolid.

5. A bearing material as defined in claim 2 wherein the lubricant is nonsolid.

6. A bearing material as defined in claim 2 wherein the lubricant in different microcapsules has individual properties to provide the bearing material with composite properties representing the combination of the individual properties of the lubricant in the different microcapsules and the microcapsules containing each lubricant of individual properties is substantially uniformly distributed throughout the body.

7. A bearing material as defined in claim 1 wherein the lubricant in different microcapsules has individual properties to provide the bearing material with composite properties representing the combination of the individual properties of the lubricant in the different microcapsules and the microcapsules containing each lubricant of individual properties is substantially uniformly distributed throughout the body.

8. A bearing material as defined in claim 6 wherein the lubricant in some of the microcapsules is a solid and the lubricant in other capsules is a nonsolid.

9. A bearing material as defined in claim 7 wherein some of the lubricant in some of the microcapsules is a solid and the lubricant in other microcapsules is a nonsolid.

10. A bearing material as set forth in claim 6 wherein the lubricant in some of the microcapsules is operative in a first temperature range to provide lubrication and the lubricant in other microcapsules is operative in a second temperature range higher than the first temperature range to provide lubrication.

11. A bearing material as set forth in claim 7 wherein the lubricant in some of the microcapsules is operative in a first temperature range to provide lubrication and the lubricant in other microcapsules is operative in a second temperature range higher the first temperature range to provide lubrication.

12. A bearing material comprising:

a plurality of frangible capsules;

a lubricant in said capsules;

means forming a body for holding the capsules, said capsules being distributed in said body;

said body at least partially defining a wear surface; and wherein the body includes a woven fabric defining pores for mechanically bonding the frangible micro capsules in the pores.

13. A bearing material comprising:

a plurality of frangible capsules;

a lubricant in said capsules;

means forming a body for holding the capsules, said capsules being distributed in said body;

said body at least partially defining a wear surface; and wherein the body includes a plurality of fibers randomly oriented in a mat for providing pores for mechanically bonding the frangible micro capsules in the pores.

* * * * *